Figure 1:
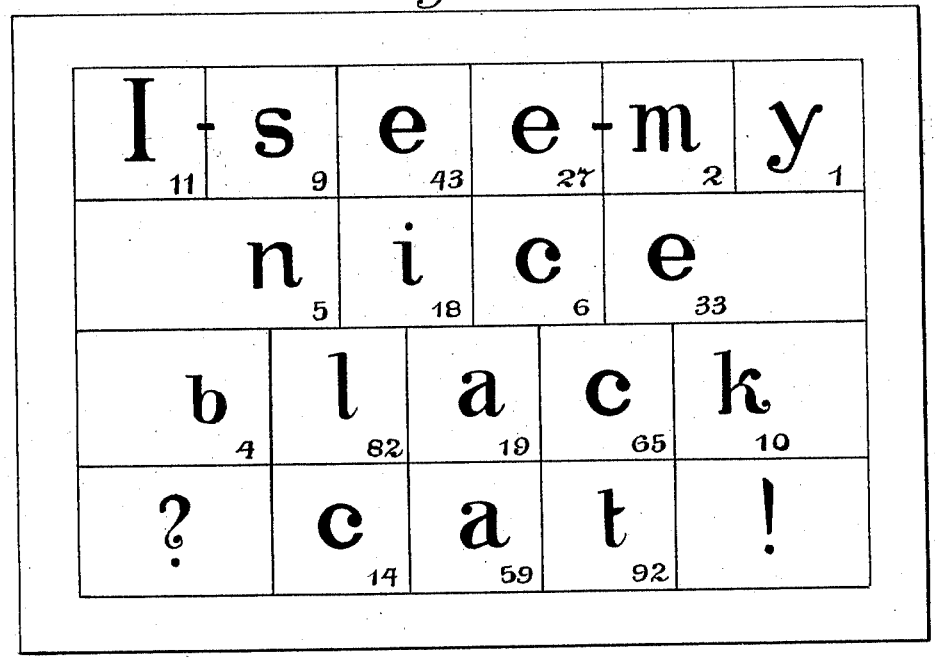

No. 760,384. PATENTED MAY 17, 1904.
L. M. DIETERICH.
GAME.
APPLICATION FILED FEB. 16, 1904.

NO MODEL.

Witnesses
Edward Rowland
Rose A. Etherson

Inventor
Ludwig M. Dieterich,
By his Attorney
F. W. Barker

No. 760,384.                                                                                         Patented May 17, 1904.

UNITED STATES PATENT OFFICE.

LUDWIG M. DIETERICH, OF NEW YORK, N. Y.

GAME.

SPECIFICATION forming part of Letters Patent No. 760,384, dated May 17, 1904.

Application filed February 16, 1904. Serial No. 193,924. (No model.)

*To all whom it may concern:*

Be it known that I, LUDWIG M. DIETERICH, a subject of the Emperor of Austria-Hungary, and a resident of the borough of Manhattan, in the city, county, and State of New York, have invented certain new and useful Improvements in Games, of which the following is a specification.

This invention relates to games or puzzles; and it has special reference to a game apparatus comprising a chart and a number of movable parts adapted to be imposed upon said chart to produce a given design or picture.

In instructing the juvenile mind in the rudiments of spelling, reading, figuring, and otherwise producing concrete formations from separate parts preference is always given to such means as include an element of amusement in the course of instruction, because thereby the attention of young people is more surely secured to the attainment of the end in view.

Hence the purpose of my invention is to provide a game which while calling forth some exertion of the mental powers of the child serves at the same time to amuse him and to render the process interesting and attractive.

One form of my invention, briefly described, consists in the provision of a chart or sheet of paper, card, or other material marked with a number of divisional spaces, said spaces containing separate characters. For example, said spaces may contain each a letter or character, the assemblage thereof comprising a word, phrase, or sentence. In addition to the aforesaid chart I prepare a series of separate pieces adapted to fit, respectively, in the aforesaid spaces and each piece bearing upon one side a character corresponding to a character in one of said spaces, while upon their reverse sides the said pieces each bear the imprint or impression of a portion of a given design or picture, which design or picture is adapted to be completely represented or produced upon accurately placing all of said pieces in their respective spaces. The complete design or picture is accurately produced by placing said pieces with the design or picture side uppermost upon the spaces whose characters correspond with the characters upon the other side of the design or picture pieces. Therefore the child in applying the pieces to the chart acquires a knowledge of spelling in building up the words found upon the chart, and the incentive to filling the spaces with the corresponding character-bearing pieces is the final production of the complete design or picture. If a word or sentence be provided upon the chart descriptive of the pictorial representation to be produced, the child more readily learns the meaning of the word or sentence which he thus constructs, and thereby unconsciously acquires knowledge which could not otherwise be so conveniently conveyed to his mind. In using these charts with their movable pieces in the form of a competitive game I provide a plurality of said charts each bearing a series of keys in their spaces, the said keys comprising numerals. Sets of pieces adapted to be placed in the spaces of the several charts are provided each with a numeral corresponding to the numerals in the spaces to receive the pieces. The notation may be consecutive, although not arranged consecutively upon the charts. For instance, supposing there are to be five charts in a game, each chart having twenty spaces to be filled with twenty pieces, then we can apply the consecutive numerals from "1" to "100," inclusive, dispersing said numerals irrespectively of their consecutive order in the one hundred spaces comprised in the said five charts, corresponding numerals being placed upon the respective one hundred pieces to be fitted in said spaces. The five charts aforesaid may each bear a different sentence, and the youthful players in taking said pieces one at a time from a common receptacle will be able to use or reject a piece for their respective charts accordingly as the same is intended to be applied thereto or not. The competition consists in the speed with which each child fills his chart.

In order that my invention may be more clearly understood and explained in detail, I have annexed hereto a sheet of drawings, in which—

Figure 2:
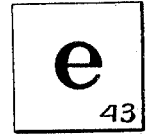
Figure 3:

Figure 1 is a plan view of a chart bearing a given sentence in the spaces. Fig. 2 is a plan view of one of the pieces to be fitted in a space of said chart. Fig. 3 is a reverse plan view of the piece indicated in Fig. 2, showing a portion of the design or picture to be produced; and Fig. 4 is a reverse plan view of a complete set of pieces, showing a picture produced by fitting together all of the pieces as placed upon the chart.

As will be noted, the sentence "I see my nice black cat" is indicated upon the chart, the letters comprising said sentence being placed in consecutive order in the spaces provided therefor. Each of said spaces also includes a different numeral. Other characters may be included, and examples are shown in the chart representation, as the interrogation-point and exclamation-mark, whereby all the twenty spaces comprised upon the chart are occupied. It will be further noted that each of the spaces upon the chart includes a different numeral of value not greater than one hundred, while it is intended that each of the pieces shall bear a numeral, the numerals upon the piece and its particular space coinciding. Now assuming that there are five charts each having twenty pieces containing sentences which occupy said spaces and each space in each chart containing a different numeral, then it will be obvious that the one hundred pieces bearing each a character and numeral may with the exercise of requisite skill be fitted in their appropriate spaces.

Figure 4:
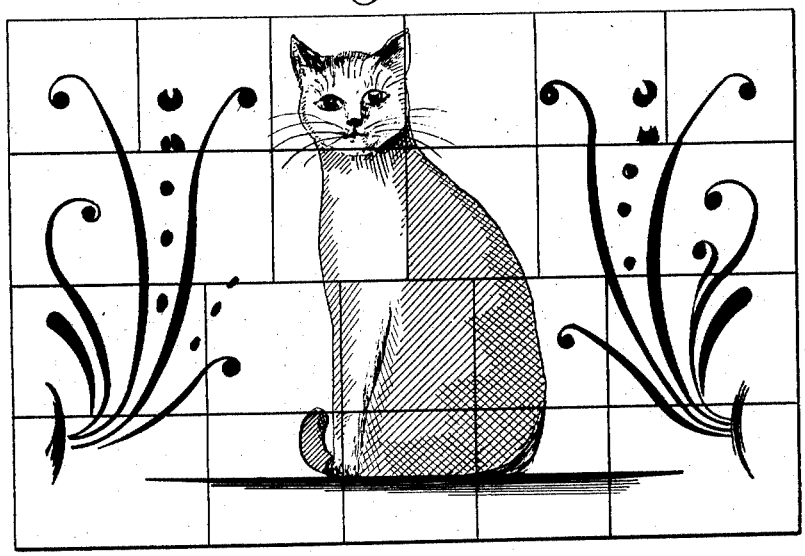

When a chart as that illustrated in the drawings is filled with the pieces appertaining thereto, their character and numeral bearing surfaces being placed face downward, a picture, as that shown in Fig. 4, is produced, illustrating the text upon the chart. It is perfectly obvious that any suitable design or picture may be assembled in this manner—such, for instance, as a flower or group of flowers or, in fact, any pictorial representation—and the text whose upbuilding by means of the correct placing of the character and numeral pieces is accomplished involves some mental activity on the part of the player and is intended to describe the name or nature of the pictorial subject.

Instead of the notation upon the pieces serving as a key for the placing of said pieces upon the chart, other characters may be substituted for the numerals, duplicates of said characters being also provided in the corresponding spaces on the chart.

I do not wish to limit myself to the employment of a chart bearing twenty spaces and a corresponding number of pieces to be fitted in said spaces, because the number of spaces and corresponding pieces may be varied to suit the subject-matter and other conditions, and likewise a complete game apparatus embodying my invention may consist of only one chart with its pieces or any desirable number of charts and pieces to be fitted thereon.

Instead of the alphabetical letter indications displayed upon the separate pieces I may apply to said pieces each a representation of a flower, or, according to the interest of the player, any other design likely to appeal to the juvenile mind, while upon the opposite side of said pieces is shown a portion of a historical or any interesting or instructive representation, which is completely displayed when all the pieces are fitted together.

Of course the subject of the pictorial representation to be built up may be of a character suitable for adult persons, if desired, and I do not limit myself to the production of any particular or given design.

Where I have referred to the use of a character in the foregoing specification, I wish the same to be understood as including the use of any letter, figure, design, or other distinguishing mark.

Having now described my invention, I declare that what I claim is—

1. An educational game apparatus comprising a chart divided into a number of spaces each bearing an indication of a character, figure, or design, and a set of pieces adapted to be placed separately upon said spaces, said pieces each bearing upon one side a representation corresponding with a similar representation in a space, and upon the opposite side bearing a divisional portion of a concrete representation.

2. An educational game apparatus comprising a chart bearing a series of character, figure, or design indications arranged in concrete form, a number of separate pieces each bearing a representation corresponding to a representation upon the chart, and means to assist in correctly placing said pieces, the said pieces each bearing upon their reverse sides a portion of a pictorial representation which is completely indicated through the correct placing of said pieces upon the chart.

3. An educational game apparatus consisting of a chart bearing a series of letters arranged to produce a word or group of words, and a numeral adjacent to each letter, together with a set of separate pieces each bearing upon one side a letter and numeral corresponding to a letter and numeral upon the chart for the correct placing of said pieces, the reverse sides of said pieces each bearing a portion of a pictorial representation which is displayed in complete form when said pieces are correctly adjusted.

4. An educational game apparatus consisting of a set of charts each divided into an equal number of divisional spaces, each space upon each chart bearing the representation of a letter or other character and a different numeral, together with a corresponding series of sets of separate pieces, each set containing as many pieces as there are spaces upon the chart, the pieces appertaining to a chart bearing each upon one side a letter or other character representation and a numeral corresponding with the indications in a space upon its chart, and each piece bearing upon its reverse side a portion of a pictorial representation which is adapted to be completely represented upon the correct adjustment of said pieces.

Signed at New York this 6th day of February, 1904.

LUDWIG M. DIETERICH.

Witnesses:
 F. W. BARKER,
 FREDERICK C. BONNY.